(12) United States Patent
Silva (10) Patent No.: US 6,930,526 B1
(45) Date of Patent: Aug. 16, 2005

(54) QUASI-FEEDFORWARD PWM MODULATOR

(75) Inventor: Faruk Jose Nome Silva, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/728,592

(22) Filed: Dec. 4, 2003

(51) Int. Cl.[7] ............................................. H03K 3/017
(52) U.S. Cl. .......................... 327/175; 327/198; 327/31; 323/274; 323/288
(58) Field of Search .......................... 327/175, 188, 327/198, 31; 323/273, 274, 280, 281, 282, 323/283, 284, 288; 363/16, 20, 21.01, 21.1

(56) References Cited

U.S. PATENT DOCUMENTS

| | | | |
|---|---|---|---|
| 5,382,918 A | | 1/1995 | Yamatake |
| 5,399,958 A | * | 3/1995 | Iyoda ........................ 323/282 |
| 5,514,947 A | | 5/1996 | Berg |
| 5,754,414 A | * | 5/1998 | Hanington ............... 363/21.12 |
| 6,232,755 B1 | * | 5/2001 | Zhang ........................ 323/282 |
| 6,259,613 B1 | * | 7/2001 | Lee et al. ..................... 363/89 |

OTHER PUBLICATIONS

Kazimierczuk, Marian K., et al. "Feedforward Control of DC-DC PWM Boost Converter", IEEE Transactions on Circuits and Systems—I: Funamental Theory and Applications, vol. 44, No. 2, Feb. 1997, pp. 143-148.

Calderoni, L., et al. "Optimal Feed-Forward Compensation for PWM DC/DC Converters", IEEE Transactions on Power Electronics, vol. 7, No. 2, Apr. 1992.

Arbetter, Barry, et al. "Feedforward Pulse Width Modulators for Switching Power Converters", IEEE Transactions on Power Electronics, vol. 12, No. 2, Mar. 1997, pp. 361-368.

* cited by examiner

Primary Examiner—Terry D. Cunningham
Assistant Examiner—An T. Luu
(74) Attorney, Agent, or Firm—Darby & Darby PC (57) ABSTRACT

Devices, circuits, and methods generate a substantially constant output voltage. A power storage element generates a DC output voltage from an input voltage. The output is sampled to generate a feedback signal. An error amplifier generates an error signal from the feedback signal and a reference voltage. A ramp generator generates a ramp signal from the error signal. A comparator generates a pulse signal by comparing the ramp signal to a threshold voltage. The pulse signal is used to control a power switch, which switches the power storage element on and off. The pulse signal is generated such that, if the input voltage changes within a certain range, a width of its pulses changes so as to maintain the output voltage substantially constant.

19 Claims, 5 Drawing Sheets

QUASI-FEEDFORWARD PWM MODULATOR

FIELD OF THE INVENTION

The present invention is related to the field of electric circuits, and more specifically to voltage dc to dc converters.

BACKGROUND

It is often desired to generate a voltage of a particular value, such as for use within a circuit. A converter may be used for this purpose, receiving a Direct Current (DC) input voltage, and outputting a DC voltage at the desired level. The input DC voltage, however, sometimes changes value, and it becomes necessary to adjust the converter to maintain the output voltage substantially constant.

Traditionally a converter was made from a voltage regulator that uses feedback. In other words, the output voltage is sensed ("fed back"), and then used to control the regulator. In a particular type of application, the regulator is a switching regulator, and control is by modulating the width of pulses ("pulse width modulation", or "PWM").

Another technique that has proven very useful in voltage mode pwm controllers is feedforward, which senses the input voltage in addition to the output voltage. The pwm ramp is modified according to the sensed input voltage—for example a peak to peak voltage is increased as the input voltage increases. A disadvantage of the feedforward topology is the required sensing of the input voltage. Another disadvantage is that the pwm ramp becomes vulnerable to noise on the input voltage, which requires some filtering to overcome.

In a voltage mode architecture, the cascade connection of the pwm modulator and the control to output transfer function are sometimes referred to as the plant (the object to be compensated). In some instances the gain of the plant is directly proportional to the input voltage. A problem has been when it is desired to compensate the transfer function to have enough phase margin for the highest input voltage case, because that causes the performance to suffer at the lowest input voltage case. The feedforward technique has solved the problem by having an adjustable modulator gain inversely proportional to the input voltage, thus rendering the compensation of the transfer function independent from the input voltage. Nevertheless, that is a complex solution.

BRIEF DESCRIPTION OF THE DRAWINGS

The invention will become more readily apparent from the following Detailed Description, which proceeds with reference to the accompanying drawings, in which.

DETAILED DESCRIPTION

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

Throughout the specification, the meaning of "a," "an," and "the" may also include plural references. The meaning of "in" includes "in" and "on."

Briefly, the present invention provides devices, circuits and methods for generating a substantially constant output voltage. A power storage element generates a DC output voltage from an input voltage. An error amplifier generates an error signal from the output voltage and a reference voltage. In some embodiments, the output is sampled to generate a feedback signal, and the feedback signal is used by the error amplifier. A comparator generates a pulse signal by comparing a ramp signal and a compared voltage, where one of the ramp signal and the compared voltage is generated from the error signal. In some embodiments, the compared voltage is a preset threshold voltage, and the ramp signal is generated from the error signal. The resulting pulse signal is used to control a power switch, which switches the power storage element on and off. The pulse signal is generated such that, if the input voltage changes within a certain range, a width of its pulses changes so as to maintain the output voltage substantially constant.

The invention implements a modulator of the duty cycle of the pulse signal that has a small-signal gain inversely proportional to the input voltage. This maintains the loop gain substantially constant, in spite of any variations in the input voltage, which in turn maintains the output voltage substantially constant, in a way similar to feedforward topologies. The result is an improved input voltage step response, and better immunity to input voltage noise. As such, the invention is particularly suitable to generate the output voltage where a voltage is needed to be substantially constant.

The invention is now described in more detail.

Figure 1:
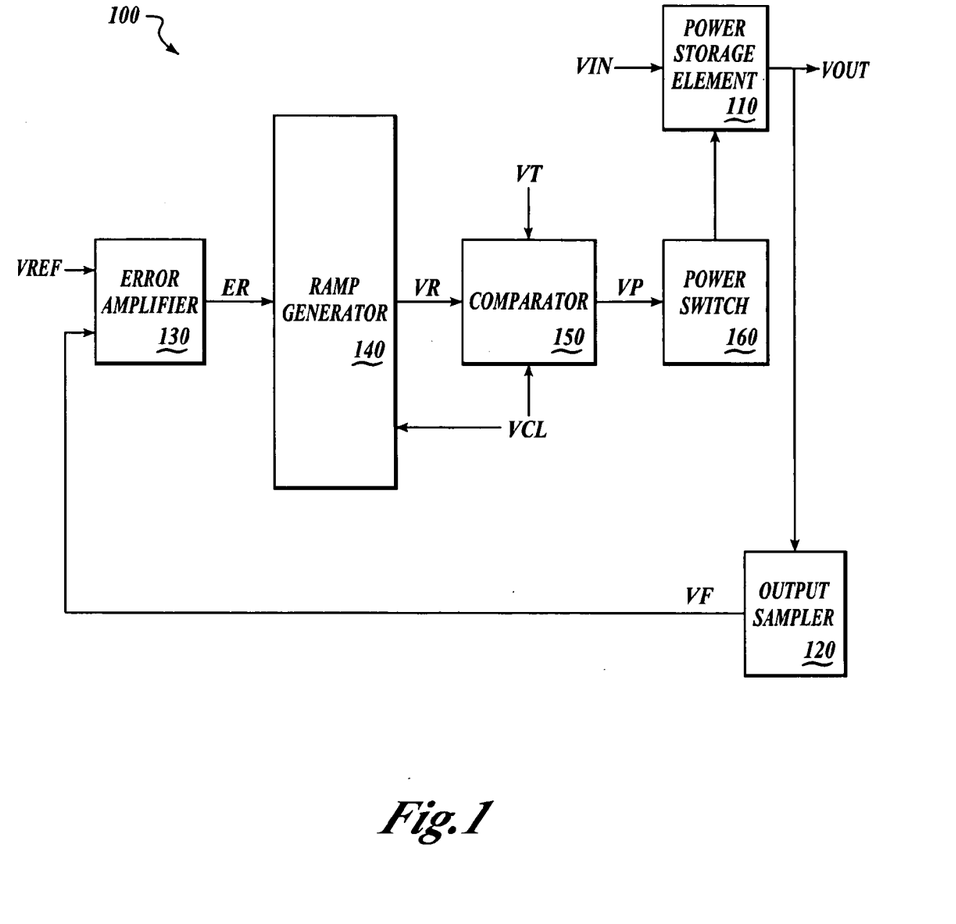
FIG. 1 is a block diagram of a quasi-feedforward DC to DC converter circuit with substantially constant output voltage.

FIG. 1 is a block diagram of a quasi-feedforward converter 100 constructed according to the invention. Power storage element 110 receives a DC input voltage VIN, and generates a DC output voltage VOUT based at least in part on input voltage VIN. Output sampler 120 generates a feedback signal VF based at least in part on output voltage VOUT. Error amplifier 130 generates an error signal ER based on a preset reference voltage VREF and the feedback signal VF. Comparator 150 generates a pulse signal VP based on a comparison of a ramp signal VR and a compared voltage. At least one of the ramp signal and the compared voltage is generated from the error signal ER. In the embodiment shown in FIG. 1, the compared voltage is represented by a threshold voltage VT, and ramp generator 140 generates ramp signal VR based on at least the error signal. In one embodiment, ramp generator 140 and comparator 150 are reset by the same clock signal VCL. Power switch 160 switches power storage element 110 on and off. Power switch 160 is controlled by pulse signal VP for charging and discharging power storage element 110.

In one embodiment of converter 100, pulse signal VP is generated such that, if input voltage VIN changes within a first range, the width of the pulses of the pulse signal is adjusted to maintain output voltage VOUT substantially constant. This type of adjustment is called Pulse Width Modulation (PWM).

Figure 2:
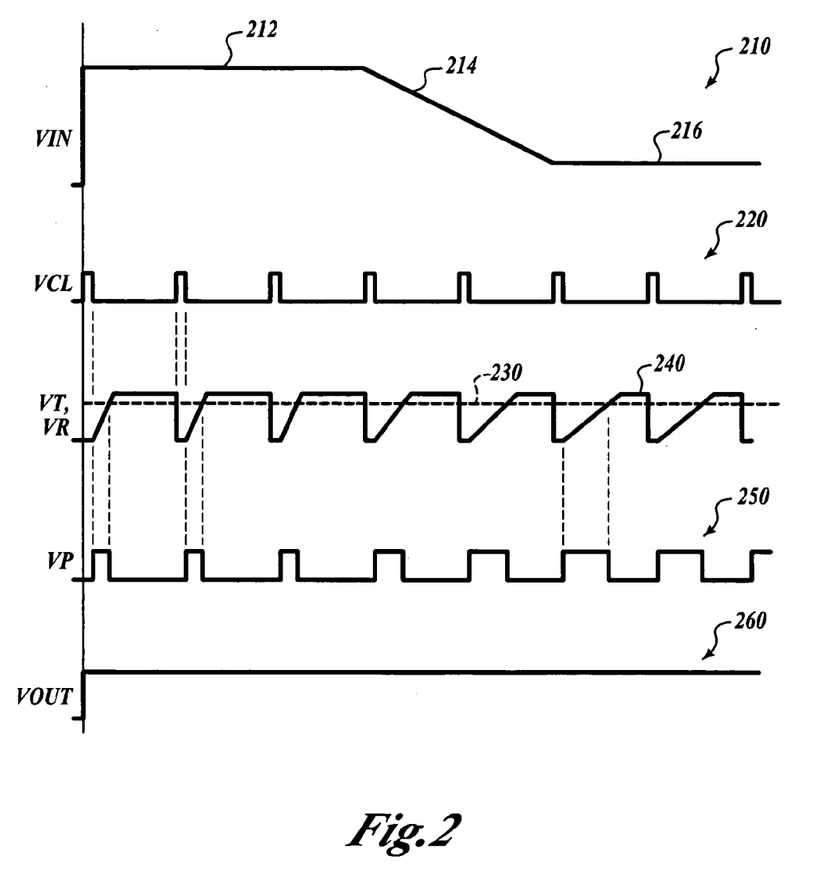
FIG. 2 is a time plot of various waveforms of the circuit of FIG. 1.

FIG. 2 illustrates time plots of various waveforms for circuit 100. Input voltage VIN has a sample waveform 210, which undergoes a change. At a first segment 212 input voltage VIN is of a high value, at a second segment 214 it decreases, and at a third segment 216 it maintains a low value. These segments could represent for example, a voltage change from 9V to 3V, in other words a voltage swing within a relatively substantial range.

Clock signal VCL has a waveform 220, with optimally periodic pulses. Threshold voltage VT has a waveform 230 that is relatively constant.

Ramp signal VR has a waveform 240. As shown, ramp signal VR is reset by clock pulse VCL, and starts increasing. It continues increasing until it reaches threshold voltage VT, and stops increasing shortly after that. As will be seen later, the rising line has a slope that can change. Then the voltage of ramp signal VR remains substantially constant, until it is reset by the next clock pulse of clock signal VCL.

Pulse signal VP has a waveform 250 that moves from zero to one on the falling edge of a pulse of clock signal VCL. Then it moves to zero again, when ramp signal VR reaches threshold voltage VT. Accordingly, the pulses of pulse signal VP have a period that is substantially constant, and depends on the period of clock signal VCL. Also the width of pulses in pulse signal VP depends at least in part on how fast ramp signal VR is increasing at the moment.

During first segment 212, input voltage VIN is constant. Accordingly, the slope of the rising line of ramp signal VR is substantially the same for every ramp. Therefore, the corresponding pulses of pulse signal VP have substantially the same width.

During second segment 214, input voltage VIN is decreasing. Accordingly, the slope of the rising line of ramp signal VR diminishes with every new ramp. Therefore, the corresponding pulses of pulse signal VP have increasing widths relative to each other.

During third segment 216, input voltage VIN is constant, but at a value lower than that of first segment 212. Accordingly, the slope of the rising line of ramp signal VR is substantially the same for every ramp (but lower than in the previous ramps). Therefore, the corresponding pulses of pulse signal VP have substantially the same width as each other (but larger than the width of the previous pulses).

In all of these cases, the slope varies substantially inversely to the duty cycle. Generally, the duty cycle may be given by the ratio of VOUT/VIN. In that case, the slope varies as the inverse of VIN, if VOUT is to be maintained substantially constant.

As discussed above, when input voltage VIN changed through three segments 212, 214, 216 of differing values, the width of the pulses of pulse signal VP also changed. This change is a form of Pulse Width Modulation (PWM) that compensates for changes in the value of input voltage VIN. Accordingly, output signal VOUT (waveform 260) is maintained at a substantially constant value.

Returning to FIG. 1, power storage element 110 may be implemented in a number of configurations, to construct different types of converters. These configurations include but are not limited to buck, boost, cuk, sepic and zeta. Of those, the invention works better with a buck configuration than a boost configuration. The buck and boost configuration are described below in more detail.

Figure 3A:
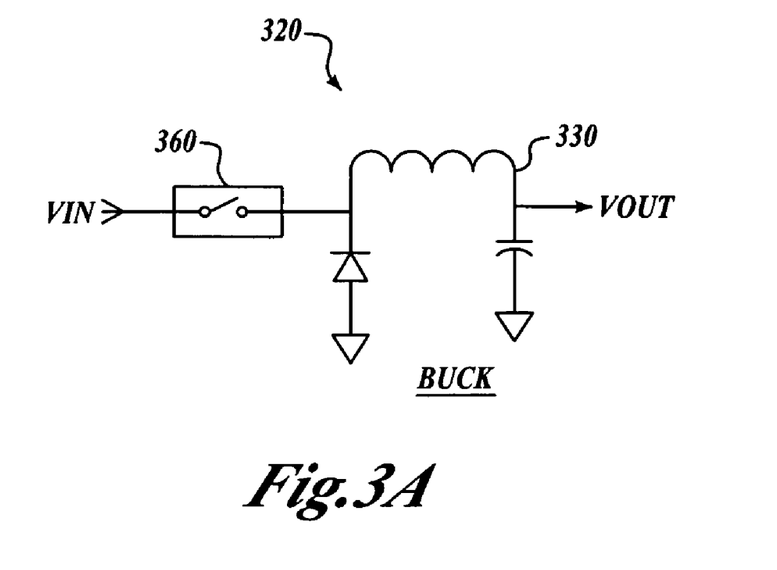
FIG. 3A is a partial schematic for a sample buck configuration of a power storage element of FIG. 1.

FIG. 3A illustrates a partial schematic 320 for a sample buck configuration. In a buck configuration, output voltage VOUT is less than input voltage VIN. A power storage element is provided, such as inductor 330. Charging inductor 330 is controlled by power switch 360. A capacitor is provided, than can be charged by inductor 330. A diode is provided that prevents the capacitor from discharging to ground.

In a charging phase, switch 360 is closed, and the capacitor is charged through inductor 330. The current through inductor 330 starts increasing, but it cannot change instantaneously from its previous value. Inductor 330 maintains a substantially constant voltage across it, which is subtracted from input voltage VIN to define output voltage VOUT.

In a discharging phase, switch 360 is opened. However, the current through inductor 330 cannot change instantaneously, so inductor 330 draws current through the diode, albeit at a decreasing rate, to maintain output voltage VOUT across the capacitor substantially constant.

Figure 3B:
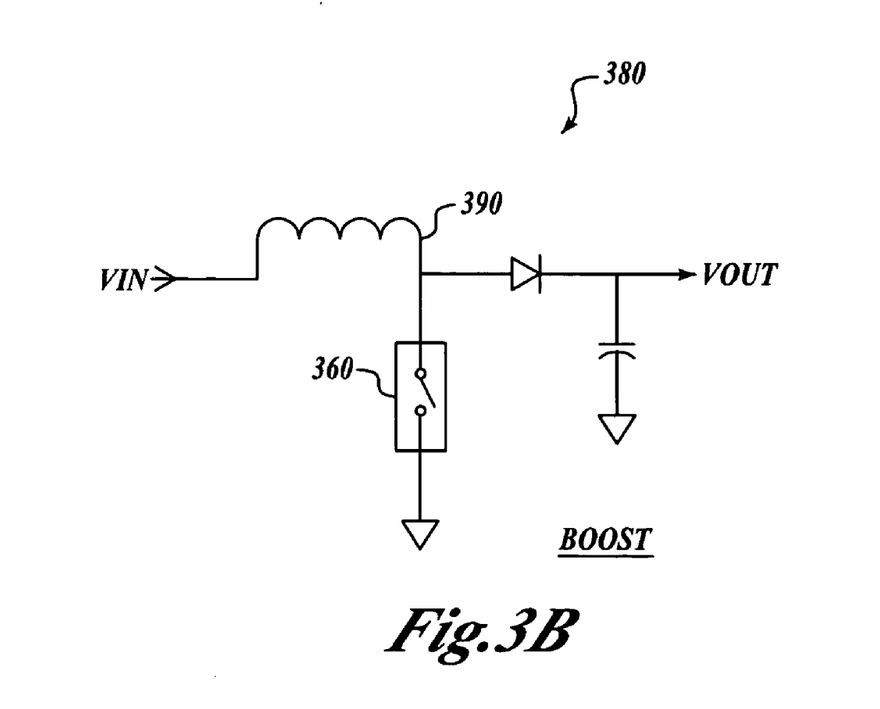
FIG. 3B is a partial schematic for a sample boost configuration of a power storage element of FIG. 1.

FIG. 3B illustrates a partial schematic 380 for a sample boost configuration. In a boost configuration, output voltage VOUT is larger than input voltage VIN. A power storage element is provided, such as inductor 390. Charging inductor 390 is controlled by power switch 360. A capacitor is provided, than can be charged by inductor 390. A diode is also provided that prevents the capacitor from discharging to ground.

In a charging phase, switch 360 is closed from the open position. The current through inductor 390 starts increasing. However, since this current cannot change instantaneously from its previous value, output voltage VOUT is maintained at a substantially constant value.

In a discharging phase, switch 360 is opened from the closed position. The current through inductor 390 starts decreasing, but it cannot change instantaneously from its previous value. However, all of it is used to maintain the capacitor charged, which maintains output voltage VOUT at a substantially constant value.

Figure 4:
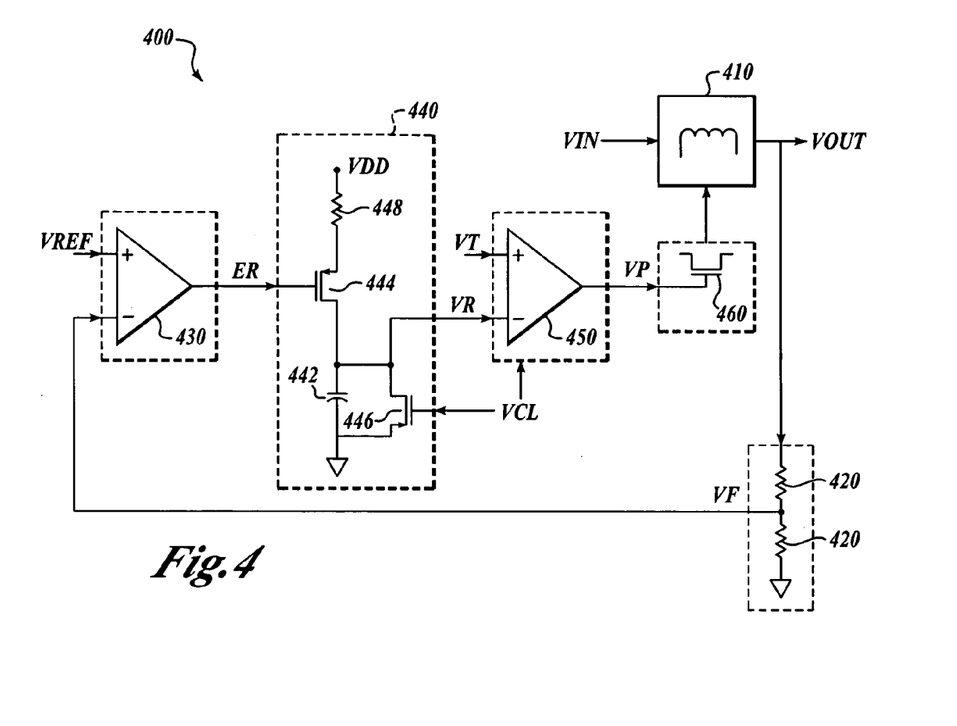
FIG. 4 is a schematic diagram of a converter.

FIG. 4 shows a partial schematic of a quasi-feedforward converter 400 for receiving input voltage VIN, and generating output voltage VOUT. It will be recognized that converter 400 has many elements similar to converter 100. Power storage element 410 may include an inductor. An output sampler is implemented by two resistors 420 to generate a feedback voltage VF. Resistors 420 implement an impedance divider. Error amplifier 430 generates error signal ER from feedback voltage VF and from reference voltage VREF. Additionally, other elements such as a capacitor resistor network may be added between error signal ER and feedback voltage VF, to control the frequency response of converter 400.

Ramp generator 440 generates ramp signal VR from error signal ER. In the embodiment shown in FIG. 4, ramp generator 440 includes ramp capacitor 442, and ramp switch 444 to charge ramp capacitor 442 in accordance with error signal ER. Ramp generator 440 further includes reset switch 446 to short ramp capacitor 444, upon reset. Reset may occur from a pulse of clock signal VCL. Ramp generator 440 additionally includes a linear element to control charging of ramp capacitor 442 through ramp switch 444. In the embodiment shown in FIG. 4, the linear element is represented by resistor 448, also known as a degeneration resistor in this case.

Comparator 450 compares ramp signal VR with a threshold voltage VT, and accordingly generates pulse signal VP. A power switch is implemented by a MOSFET 460. Element 410 and transistor 460 may be configured as shown in FIG. 3A or FIG. 3B, such as for power switch 360. A gate of transistor 460 receives pulses from pulse signal VP, and accordingly switches on and off power storage element 410.

Figure 5:
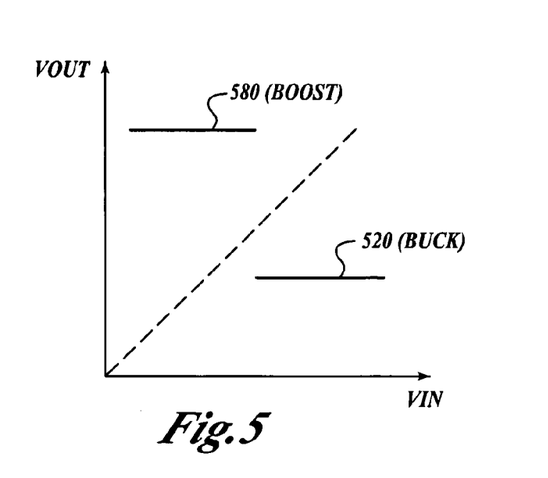
FIG. 5 represents graphed plots of the output voltages resulting from the converter of FIG. 4, by implementing the buck and boost configurations of FIGS. 3A and 3B.

FIG. 5 represents graphed plots of output voltages VOUT as a function of input voltages VIN resulting from a converter according to the invention, such as converters 100, 400. When the buck configuration 320 of FIG. 3A is implemented, the result is plot 520. When the boost configuration 380 of FIG. 3A is implemented, the result is plot 580.

Figure 6:
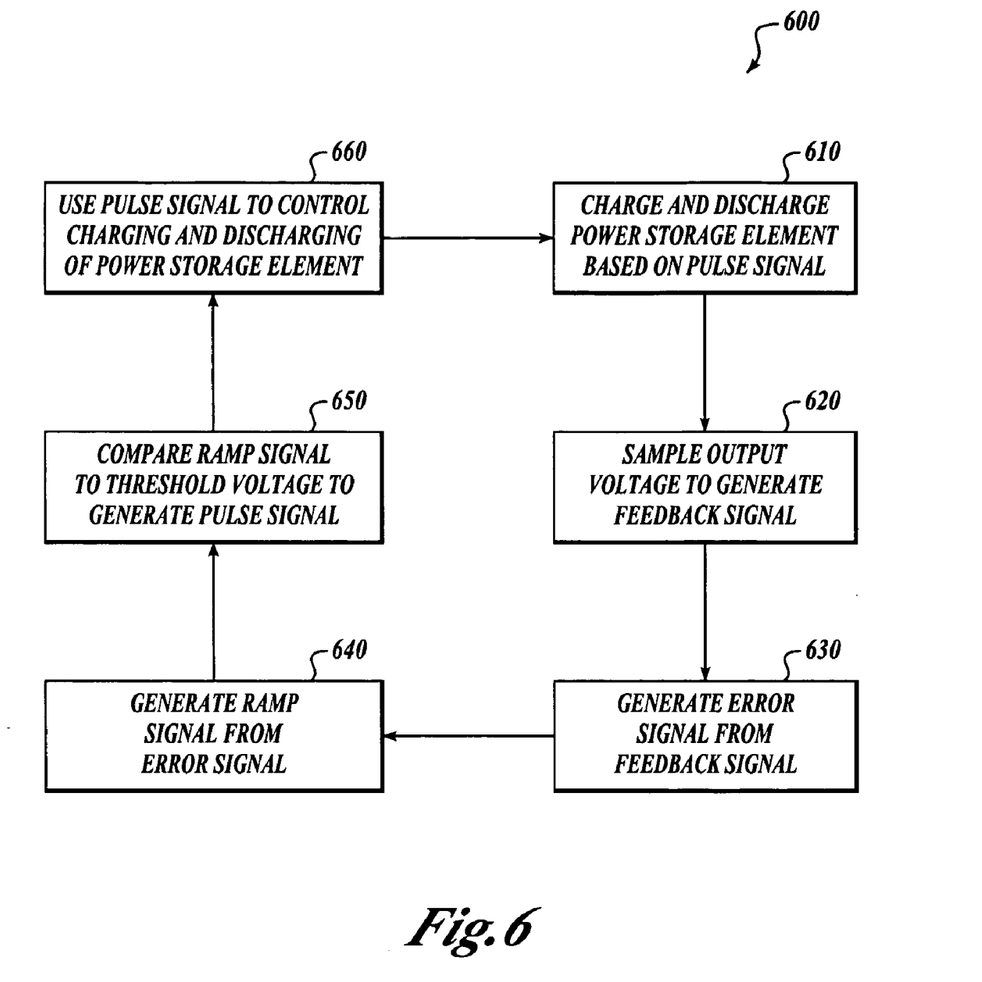
FIG. 6 is a diagram illustrating a method according to an embodiment of the present invention.

FIG. 6 shows a diagram 600 for illustrating a method according to an embodiment of the invention. The method of diagram 600 may also be practiced by different embodiments of the invention, including but not limited to circuits 100 and 400.

The blocks of diagram 600 are interrelated as shown. Starting at block 610, there is charging and discharging of a power element to generate an output voltage. At optional next block 620, the output voltage is sampled to generate a feedback signal. At next block 630, an error signal is generated from the output voltage. If optional block 620 is indeed implemented, then the error signal is generated from the feedback signal. At next block 640, a ramp signal is generated from the error signal. At next block 650, the ramp signal is compared to a preset threshold voltage, which facilitates the generation of a pulse signal. At next block 660, the pulse signal is used to control the alternating charging and discharging of block 610.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. A circuit, comprising:
   a power storage element to generate a DC output voltage from an input voltage;
   an output sampler to generate a feedback signal from the output voltage;
   an error amplifier to generate an error signal from the feedback signal;
   a ramp generator to generate a ramp signal from the error signal, wherein the compared voltage is a preset substantially constant voltage;
   a comparator to generate a pulse signal by comparing the ramp signal and a compared voltage, wherein one of the ramp signal and the compared voltage is generated from the error signal; and
   a power switch to switch the power storage element on and off as controlled by the pulse signal,
   wherein the pulse signal is generated such that, if the input voltage changes within a first range, a width of pulses of the pulse signal changes so as to maintain the output voltage substantially constant.

2. The circuit of claim 1, wherein
   the power storage element is arranged in a configuration that is one of a buck, a boost, a cuk, a sepic and a zeta configuration.

3. The circuit of claim 1, wherein
   the output sampler includes an impedance divider.

4. The circuit of claim 1, wherein
   the comparator and the ramp generator are reset by the same clock signal.

5. A DC to DC converter, comprising:
   a power storage element to generate a DC output voltage from an input voltage;
   an error amplifier to generate an error signal from the output voltage;
   a ramp generator to generate a ramp signal from the error signal;
   a comparator to generate a pulse signal by comparing the ramp signal to a preset threshold voltage; and
   a power switch to switch the power storage element on and off as controlled by the pulse signal.

6. The converter of claim 5, wherein
   the power storage element is arranged in a configuration that is one of a buck, a boost, a cuk, a sepic and a zeta configuration.

7. The converter of claim 5, wherein
   the comparator and the ramp generator are reset by the same clock signal.

8. The converter of claim 5, further comprising:
   an output sampler to generate a feedback signal from the output voltage, and
   wherein the error amplifier uses the feedback signal as representative of the output voltage.

9. The converter of claim 5, wherein
   the ramp generator includes
   a ramp capacitor, and
   a ramp switch to charge the ramp capacitor in accordance with the error signal.

10. The converter of claim 9, wherein
    the ramp generator further includes a reset switch to short the ramp capacitor.

11. The converter of claim 9, wherein
    the ramp generator further includes a linear element to control charging of the ramp capacitor through the ramp switch.

12. The converter of claim 11, wherein
    the linear element is a resistor.

13. A device comprising:
    means for alternatingly charging and discharging a power storage element to generate a DC output voltage from an input voltage;
    means for generating an error signal from the output voltage;
    means for generating a ramp signal from the error signal;
    means for comparing the ramp signal to a preset threshold voltage to generate a pulse signal; and
    means far using the pulse signal to control the charging and discharging of the power storage element.

14. The device of claim 13, wherein
    the means for generating the ramp signal includes means for charging a ramp capacitor in accordance with the error signal.

15. A method comprising:
    alternatingly charging and discharging a power storage element to generate a DC output voltage from an input voltage;

generating an error signal from the output voltage;
generating a ramp signal from the error signal;
comparing the ramp signal to a preset threshold voltage to generate a pulse signal; and
using the pulse signal to control the charging and discharging of the power storage element.

16. The method of claim 15, further comprising:
sampling the output voltage to generate a feedback signal, and
wherein generating the error signal uses the feedback signal as representative of the output voltage.

17. The method of claim 15, wherein
generating the ramp signal includes charging a ramp capacitor in accordance with the error signal.

18. The method of claim 17, wherein
charging is performed through a linear element.

19. The method of claim 17, further comprising:
shorting the ramp capacitor responsive to a clock signal.

* * * * *

UNITED STATES PATENT AND TRADEMARK OFFICE
CERTIFICATE OF CORRECTION

PATENT NO. : 6,930,526 B1
DATED : August 16, 2005
INVENTOR(S) : Silva

It is certified that error appears in the above-identified patent and that said Letters Patent is hereby corrected as shown below:

Title page,
Item [56], References Cited, OTHER PUBLICATIONS,
"Kazimierczuk, Marian K., et al." reference, delete "Funamental" and substitute
-- Fundamental --.

Column 6,
Line 58, delete "far" and insert -- for --.

Signed and Sealed this

Thirteenth Day of December, 2005

JON W. DUDAS
*Director of the United States Patent and Trademark Office*